UNITED STATES PATENT OFFICE.

WILLIAM R. STACE, OF ROCHESTER, NEW YORK, ASSIGNOR OF ONE-HALF HIS RIGHT TO NICHOLAS WILKINSON, OF SAME PLACE.

IMPROVEMENT IN PROCESSES FOR TANNING PICKLED SKINS.

Specification forming part of Letters Patent No. 159,366, dated February 2, 1875; application filed July 17, 1874.

*To all whom it may concern:*

Be it known that I, WILLIAM R. STACE, of Rochester, in the county of Monroe and State of New York, have invented a new and useful Process for Cleansing and Tanning Pickled Skins for the Production of Leather; and I hereby declare the following to be a description thereof.

My method consists in treating pickled skins by means of rapid mechanical agitation with a bath of any hydrocarbon radical or its alcohol, in which is suspended the quinto-hydrate of alumina, manufactured by the Pennsylvania Salt Company; but it is probable all the other hydrates of alumina will answer the same purposes.

The mechanical appliance employed to secure motion may be constructed after any plan which accords with each operator's intentions and opinions of propriety and expedition; but since alumina hydrate and hydrocarbon oils do not form chemical combinations, and their effects in the formation of leather are obtained through mechanically nascent activity, some kind of agitation must be enforced to provide the requisite contact.

In making experiments personally, I have used an external and internal cylinder, fitted to the same longitudinal and central axis. The outer case is made stationary, within which the inner vessel is so adjusted that it can be rapidly revolved. The internal cylinder is so constructed that the same may readily be separated into two equal parts or halves, except that the journals thereof are permanently attached to one of said halves. A cylindrical nickel-plated metallic, or a wooden-withe, basket of less diameter, is also fitted to the interior cylinder, in such a manner that it may be securely adjusted for any desirable term, with its longitudinal axis in direct line with that of the two exterior cylinders. Into the basket I place a sufficient number of pickled sheep-skins, in such a manner as to make a loose association, and provide freedom of motion through the interstices to liquids and any powders they may hold in solution. Through the hollow journals of this cylinder a quantity of petroleum, benzine, or coal-tar benzole is injected, sufficient to one-half fill the cylinder; but the benzine or benzole should be previously agitated prior to induction, to keep the alumina hydrate suspended. The casing is now to be closed, and the internal cylinder containing the basket of skins, benzine, and alumina hydrate must be rapidly rotated from fifteen to thirty minutes, when the skins will be converted into leather. The machine may then be stopped long enough to remove a plug from the periphery of the internal cylinder, when the casing may again be closed, and rotation re-established. This last operation removes the excess of alumina hydrate and benzine to the basin of the casing, and dries the skins. Rotation is again to be arrested, and the skins removed as perfectly-formed leather, that may subsequently receive any other manipulation or coloring which fits it for the various branches of industry.

The foregoing presents all the essential relations of my invention, and would enable a skilled artisan to perform the operation.

I do not claim a mechanical device, or to understand the chemical transformations that are achieved by the process and agents employed; but infer that the benzine and other hydrocarbons and all their alcohols except carbolic acid and creosote simply remove the fatty substances and admit the alumina hydrates to intimate contact with the acid, previously in combination with the gelatine of the pickled skins, thereby forming a soluble concentrated salt of aluminum. Neither am I certain that the alumina hydrate (cryolite) and the consequent associations of the processes for its extraction do not sustain some important relations to the remarkable results obtained.

I therefore claim as my invention—

The process herein described for tanning pickled skins by the use of liquid hydrocarbons or their alcohols, in conjunction with the hydrates of alumina.

WILLIAM R. STACE.

Witnesses:
WILLIAM MORGAN,
HAYDN M. BAKER.